United States Patent [19]

Lo-Pinto et al.

[11] Patent Number: 5,659,935

[45] Date of Patent: Aug. 26, 1997

[54] APPARATUS FOR INSTALLING A BRANCH TAPPING ON A PIPE

[75] Inventors: Jean-Marie Lo-Pinto, Ezanville; Jacques Foucart, Argenteuil; Jean-Claude Puyaumont, Groslay; Christian Vilchenon; Thierry Vincent, both of Epinay-sur-Seine, all of France

[73] Assignee: Gaz De France, Paris, France

[21] Appl. No.: 365,039

[22] Filed: Dec. 28, 1994

[30] Foreign Application Priority Data

Dec. 30, 1993 [FR] France .................................. 93 15874

[51] Int. Cl.⁶ ..................... B23P 19/00; B23B 41/08; F16K 43/00; F16L 55/10
[52] U.S. Cl. ................. 29/33.7; 29/213.1; 29/890.11; 83/745; 137/318; 285/21.1; 408/99
[58] Field of Search ............................ 29/33.7, 213.1, 29/890.1; 83/745, 171; 137/318; 285/21, 23, 24; 408/87, 99, 102, 101

[56] References Cited

U.S. PATENT DOCUMENTS

| | | | |
|---|---|---|---|
| 4,680,848 | 7/1987 | Goldner | 29/213.1 |
| 4,832,069 | 5/1989 | Gale et al | 408/87 X |
| 5,257,644 | 11/1993 | Saha et al. | 137/318 |

FOREIGN PATENT DOCUMENTS

| | | |
|---|---|---|
| 0088703 | 9/1983 | European Pat. Off. . |
| 0205696 | 12/1986 | European Pat. Off. . |
| 0235917 | 9/1987 | European Pat. Off. . |
| 2620649 | 3/1989 | France . |
| 2648538 | 12/1990 | France . |

*Primary Examiner*—William Briggs
*Attorney, Agent, or Firm*—Shenier & O'Connor

[57] ABSTRACT

The apparatus enables a saddle-shaped parallel connection tapping to be installed on a pipe from the top of a hole in the ground. The apparatus comprises a frame having a tipping thrust device in the form of a spade controlled by rodding and designed to take up a position beneath the pipe, and a removable tapping positioner guided in the frame and including a tubular column that is split along one of its generator lines and that is fitted at its bottom end with a disconnectable module engaging the rims of the tapping. Means are provided on the frame to exert downwards pressure on the tapping support module in selective manner, and the removable module includes means for welding the tapping to the pipe. A device for driving a plug or a perforator device can be inserted in the cylindrical column of the tapping positioner from above.

13 Claims, 6 Drawing Sheets

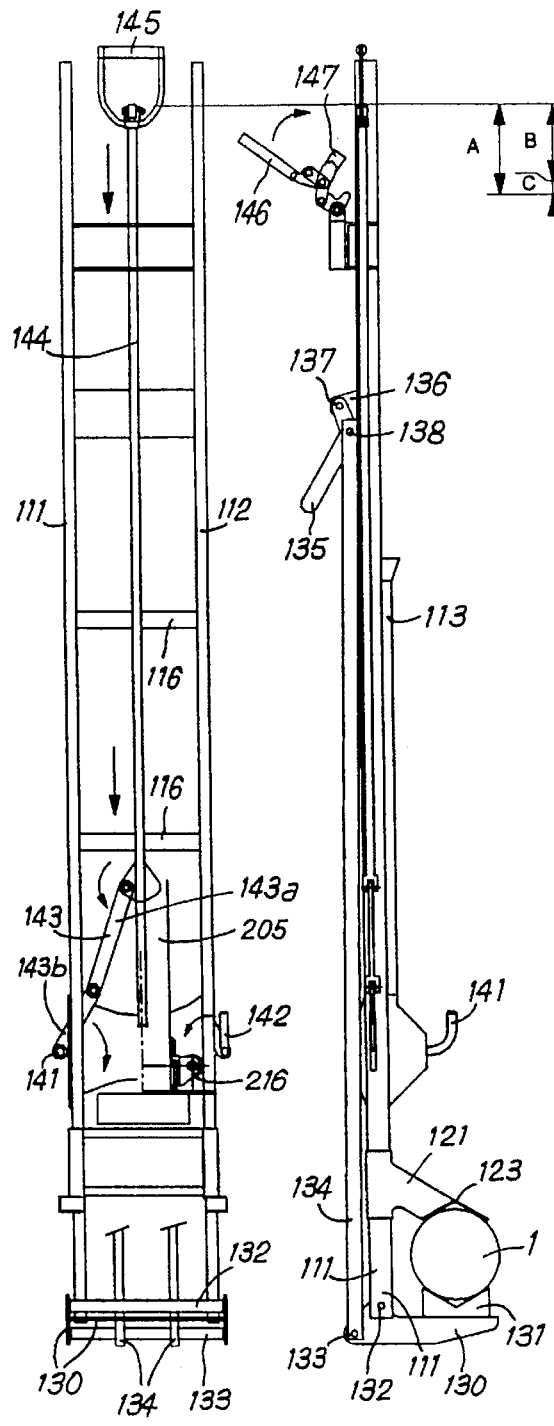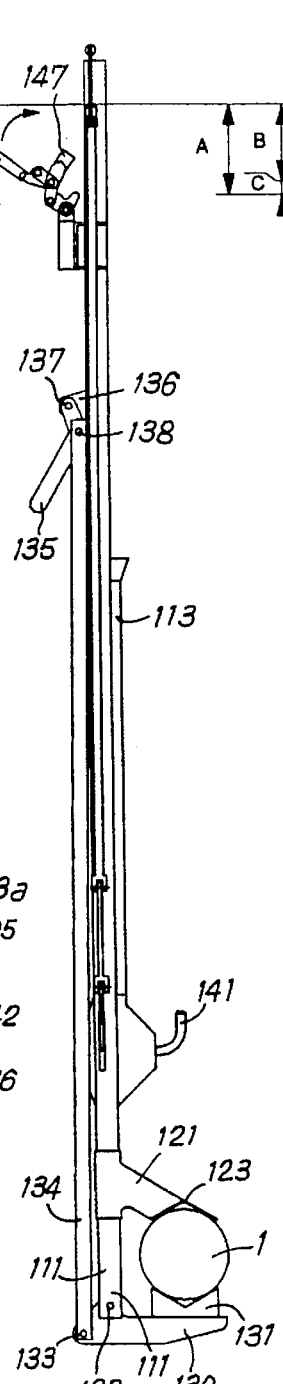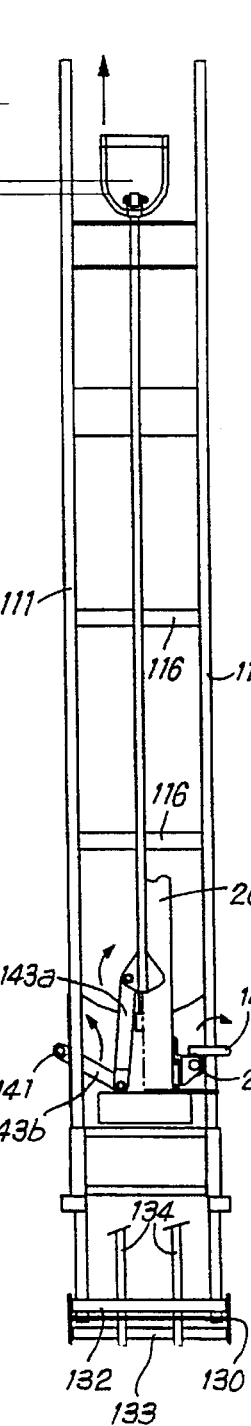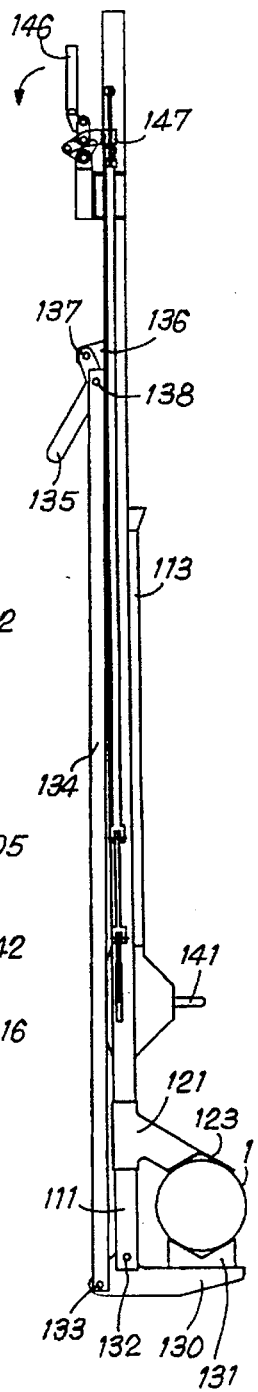

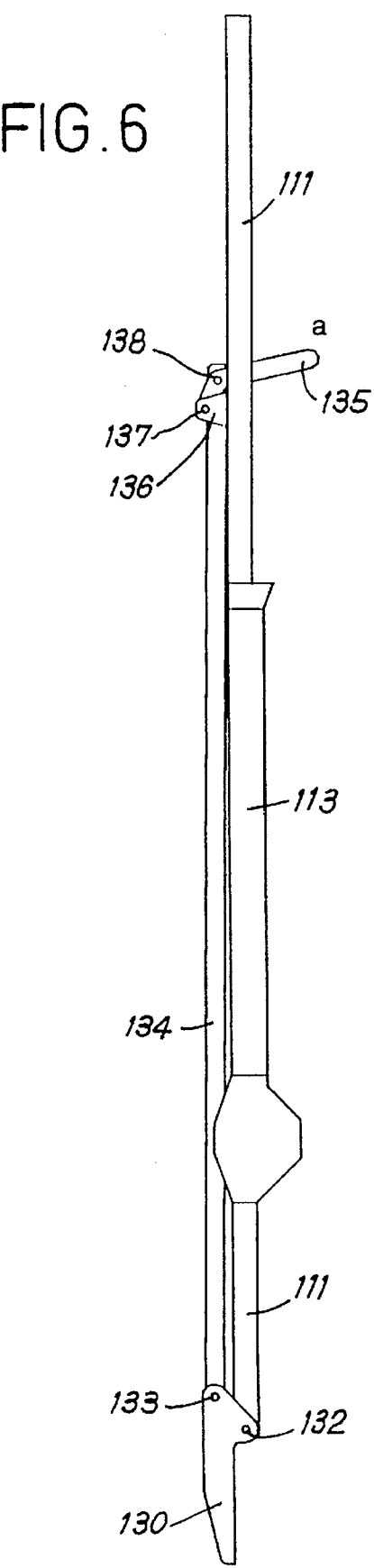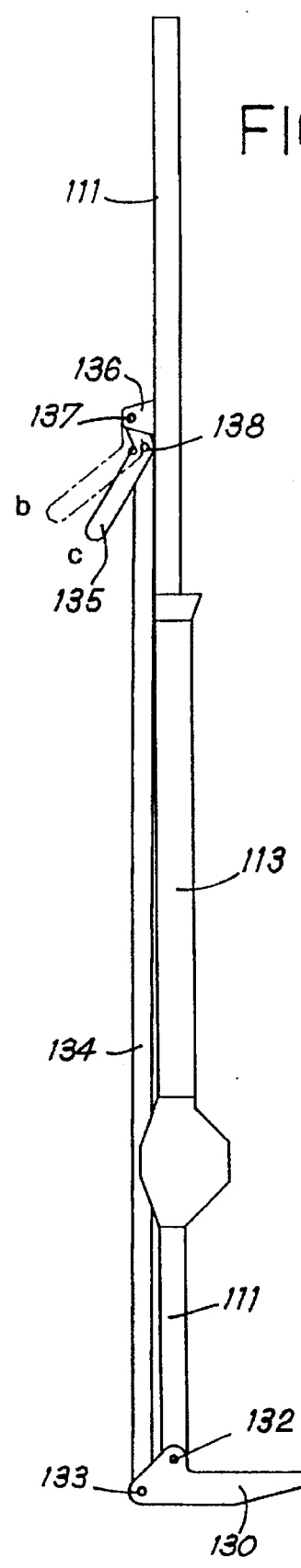

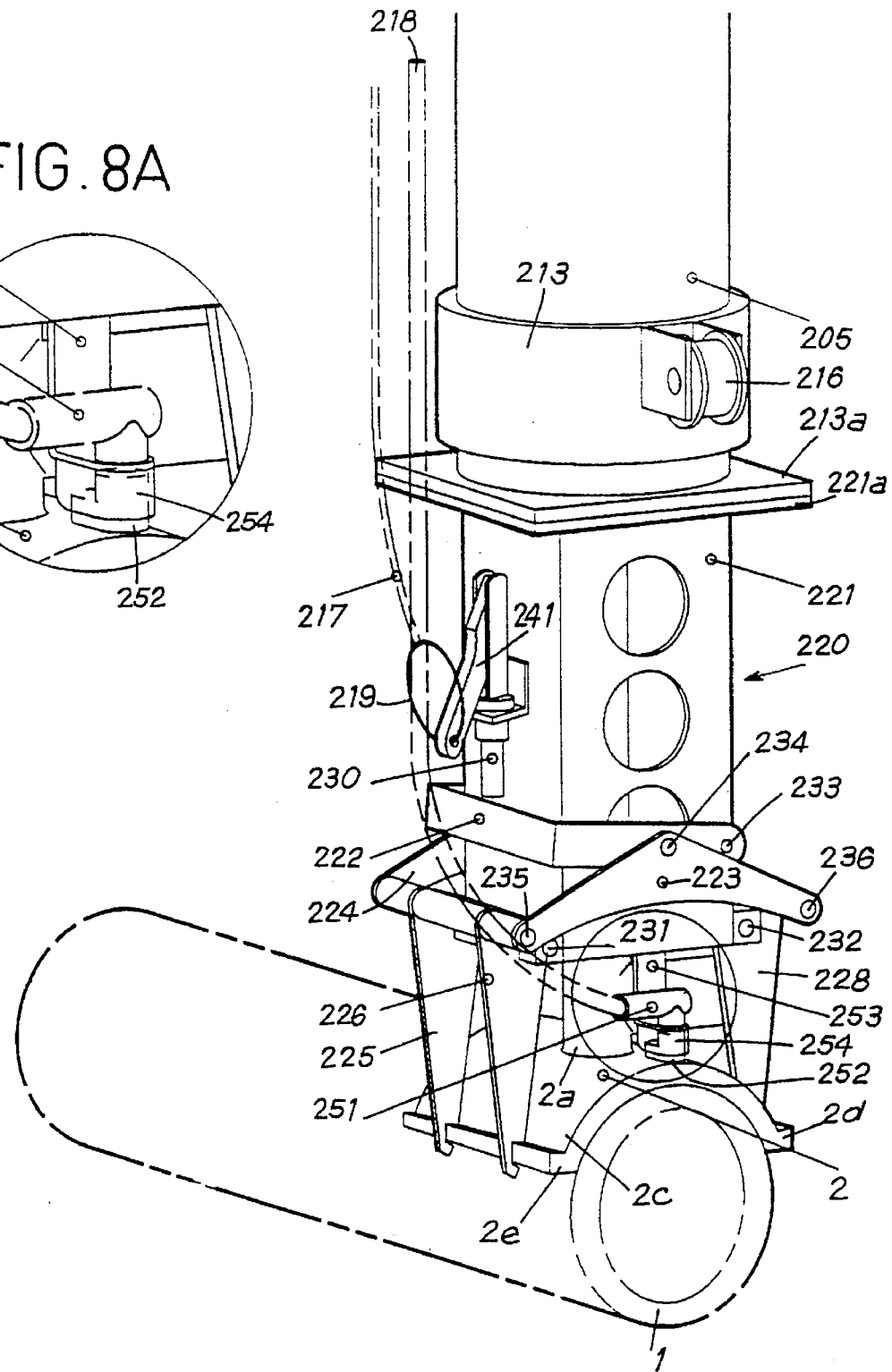

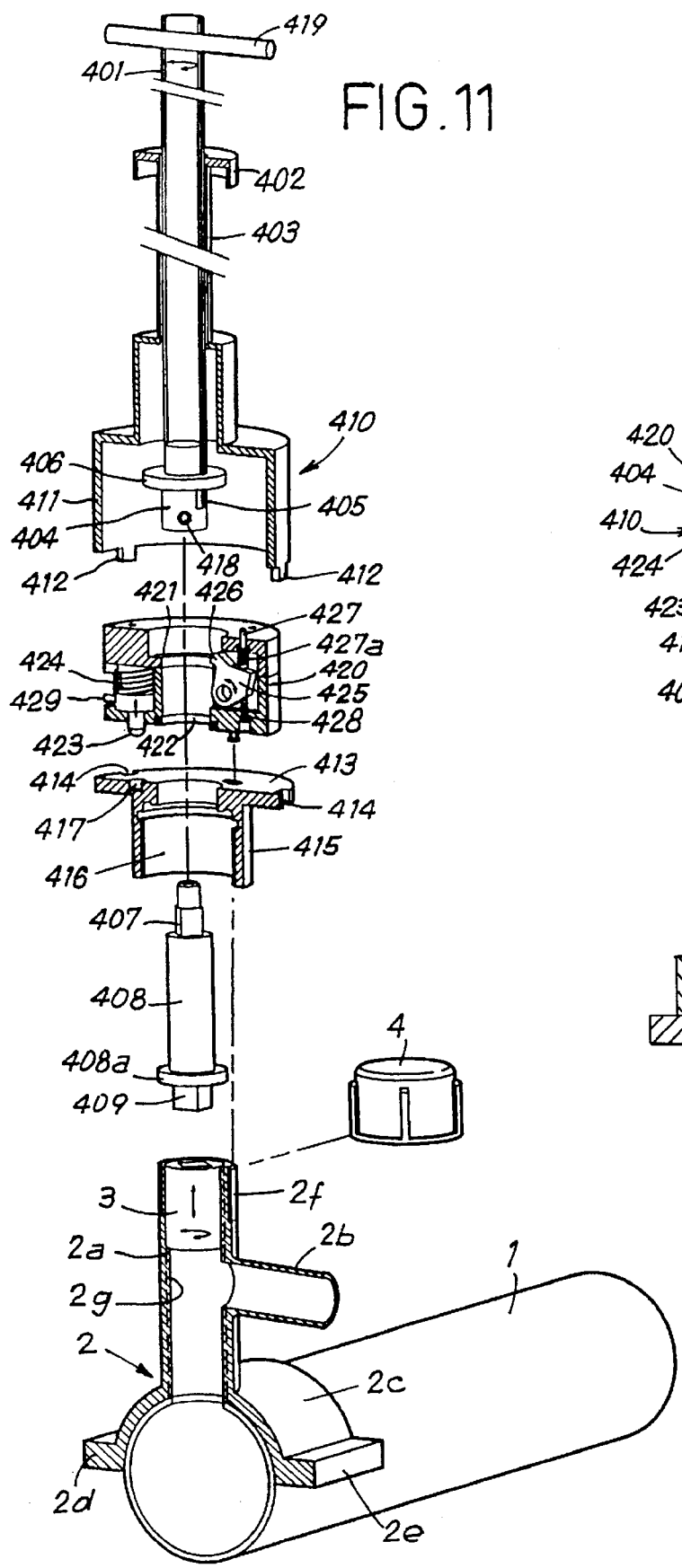

APPARATUS FOR INSTALLING A BRANCH TAPPING ON A PIPE

FIELD OF THE INVENTION

The present invention relates to an apparatus for installing a saddle-shaped parallel connection tapping on a pipe, in particular a pipe for distributing gas, the tapping being put into place from the top of a hole dug around the installation zone for the tapping, the apparatus comprising means for grasping the tapping and means for applying a determined clamping force between the tapping and the pipe, in particular for the purpose of securing the tapping to the pipe during an operation of welding the tapping to the pipe.

BACKGROUND OF THE INVENTION

When it is desired to install branch tappings or parallel connections on pipes, such as gas distribution pipes, or indeed pipes for conveying other types of fluid, such as water, it is desirable, particularly in an urban environment, to be able to dig a hole of small dimensions so as to avoid disturbing the surroundings and so as to restrict the inconvenience caused to vehicle or pedestrian traffic. If the section of the trench is small, it is not possible for a person to go down to the bottom thereof, so the operations of installing the tapping must be capable of being performed from the top of the hole.

Proposals have already been made, in particular in documents FR-A-2 620 649 and FR-A-2 648 538 for various apparatuses that serve to put connection tappings into place on pipes, and in particular to exert clamping forces between a tapping and a pipe in order to facilitate welding the tapping to the pipe.

When the pipe and the parallel connection tapping are made of heat-fusible material, such as polyethylene, the tapping is advantageously secured to the pipe by welding. Under such circumstances, the saddle with which the parallel connection is provided is itself fitted with an electrical resistance element in the immediate proximity of its concave surface that is designed to be pressed against the convex surface of the pipe. While the tapping is held clamped against the pipe, electricity is caused to flow through the electrical resistance element of the saddle of the tapping, thereby causing the saddle of the tapping to melt and to be welded to the portion of the pipe that is in contact therewith.

In the prior art apparatuses described in the above-specified documents, a tapping is positioned by means of its own tubular column, and that does not make it possible to obtain an assembly of good quality and to guarantee a reliable weld. Unfortunately, with pipes such as gas mains, it is essential that the weld should avoid giving rise to faults that could subsequently give rise to gas leaks.

Furthermore, known positioning apparatuses are difficult to handle in the absence of abutment or guide elements, and they lend themselves poorly to use with tappings of various different types or with pipes of different diameters.

OBJECTS AND SUMMARY OF THE INVENTION

The present invention seeks to remedy the above-mentioned drawbacks and to make it possible to perform all of the operations required for installing a parallel connection tapping on a pipe from the top of a hole in a manner that is both convenient and reliable.

More particularly, the invention seeks to guarantee that the various tools used during such installation of a parallel connection tapping are accurately positioned and to guarantee that the intensity and the direction of clamping force during the operation of securing the tapping and the pipe are optimized.

Another object of the invention is to make it easy to adapt to various different types of tapping and of pipe.

These objects are achieved by an apparatus for installing a saddle-shaped parallel connection tapping on a pipe, in particular a pipe for distributing gas, the tapping being put into place from the top of a hole dug around the installation zone for the tapping, the apparatus comprising means for grasping the tapping and means for applying a determined clamping force between the tapping and the pipe, in particular for the purpose of securing the tapping to the pipe during an operation of welding the tapping to the pipe, the apparatus comprising:

a) a frame comprising a vertical support structure provided with guide slideways and including both a set of telescopic legs connected to the top portion of the structure and a tipping thrust device in the form of a spade placed at the bottom end of the structure and designed to take up a position beneath the pipe and capable of performing pivoting motion between a vertical rest position and a horizontal working position under the control of rodding from the top portion of the frame;

b) a removable tapping positioner comprising a tubular column that is split along one of its generator lines and that is fitted at its bottom end with a disconnectable tapping-support module provided with tapping-retaining means for holding rims of the tapping, the tapping positioner including guide means that cooperate with said guiding slideways during downwards insertion into the frame;

c) pressure-exerting means mounted on the frame to exert downwards pressure on the tapping support module in selective manner as determined from the top of the frame;

d) means mounted on the removable tapping support module for securing the tapping to the pipe;

e) a removable driver device adapted to be inserted laterally into the tool-positioning column and provided with guide means inside said tool-positioning column;

f) a removable perforator device adapted to be inserted laterally into the tool-positioning column and provided with guide means inside said tool-positioning column; and g) means mounted on the tapping positioner for remotely controlling release of said tapping-retaining means.

The use of a frame that is fixed simultaneously to the pipe by the tipping thrust device in the form of a spade and to the ground at the top of the trench by telescopic legs guarantees that the force applied by the tapping is normal relative to the pipe providing the entire module for supporting the tapping is guided in the frame.

Furthermore, the fact that the tapping is held via its edges rather than via its column guarantees good quality assembly while accommodating large tolerances on the distance between the edges of the tapping.

The tool-positioning column provides full guidance for the various accessories, thereby achieving even greater ease of use and better safety.

In particular, when screwing on or off the plug covering a tapping, there is no risk of damaging the threads by the tool being at a wrong angle. Similarly, it becomes simpler to use a perforator for piercing the tapping and for raising its closing punch.

According to a particular characteristic which ensures optimized positioning of the frame relative to the pipe, a first V-shaped support is disposed on the spade to bear against the bottom portion of the pipe and upsidedown V-shaped supports are adjustably mounted on the frame structure to be placed against the top portion of the pipe on either side of the tapping that is to be installed.

In a particular embodiment, the pressure-exerting means mounted on the frame comprise pivoting fingers that are controlled from the top by links hinged on a vertical rod and co-operating with wheels disposed at the bottom of the tool-positioning column.

Preferably, the apparatus further comprises means for locking the control means of the pivoting fingers and a rated spring incorporated at the base of the tool-positioning column for establishing a predetermined pressure on the tapping support module.

According to an advantageous characteristic, the means for holding the rims of the tapping comprise parts provided at their bottom ends with notches designed to engage on the rims of the tapping, the parts being hinged at the top firstly to the fixed body of the tapping support module and secondly to spreaders that are themselves hinged to a structure for controlling opening or closing of said hinged parts.

In which case, the control structure is held in its closure-controlling position for the hinged parts by a sliding rod provided with locking means that can be unlocked from above by means of a control cable.

In another aspect of the invention, said means for securing the tapping to the pipe comprise welding receptacles secured to the tapping, welding plugs connectable to the welding receptacles and connected by cable to a welding unit located outside the hole, and tabs secured to the tapping support module and comprising a portion disposed around a welding receptacle and beneath the welding plug so as to cause the welding plug to be automatically disconnected when the tapping support module is withdrawn after the tapping has been put into place on a pipe.

In a particular embodiment, said perforator device comprises an internal rod whose bottom end is connected to a removable extension provided with an end that cooperates with a punch disposed in the column of a tapping to be installed, and an external tube concentric with the internal rod and secured to a housing surrounding the connection zone between the internal rod and the removable extension.

More specifically, the coupling housing of the perforator is made of three portions and comprises a top outer case, a base plate that is extended downwards by a cylindrical portion provided with an inside thread for screwing onto an outside thread of the column of the tapping to be installed, and a central body that forms an abutment for the internal rod of the perforator.

In a particular embodiment, the central body of the coupling housing includes a rocking pawl that co-operates with a collar secured to the internal rod of the perforator and with a notch formed in the bottom portion of said internal rod situated beneath said collar upstream from the removable extension and the central body includes a stud subjected to drive from a spring for positioning said body on said base plate.

Furthermore, the perforator device includes at least one lip gasket interposed between the removable extension and the central body, an O-ring interposed between the central body and the base plate, and an O-ring interposed between the base plate and the top portion of the column on which the cylindrical portion extending the base plate downwards is screwed.

BRIEF DESCRIPTION OF THE DRAWINGS

Other characteristics and advantages of the invention appear from the following description of a particular embodiment of the invention given by way of non-limiting example, and made with reference to the accompanying drawings, in which:

FIGS. 2 and 3 are respectively a front view and a side view of the frame of apparatus of the invention during the stage in which a parallel connection tapping positioner is put into place on a pipe;

FIGS. 4 and 5 are respectively a front view and a side view of the frame of the apparatus of the invention during a step in which a positioner for positioning a parallel connection tapping on a pipe is withdrawn;

FIGS. 6 and 7 are elevation views of a portion of the frame of the FIG. 1 apparatus, respectively in a position for insertion or withdrawal into or from a hole, and in a working position;

FIG. 8 is a perspective view of a portion of the parallel connection tapping positioner of the invention placed in its working position for installing a parallel connection tapping on a pipe;

FIG. 8A is an enlarged detail view of FIG. 8 showing the electrical connection means for a plug for welding by hot fusing;

FIG. 11 is an exploded perspective view, partially in section, of a pipe-perforating device suitable for use in the context of the present invention when installing a parallel connection tapping;

FIG. 12 is a view analogous to FIG. 11, but showing the various elements of the perforation device engaged in one another; and FIG. 13 is a detail view showing the positioning of gaskets in a perforation device as shown in FIGS. 11 and 12.

MORE DETAILED DESCRIPTION

Figure 1:
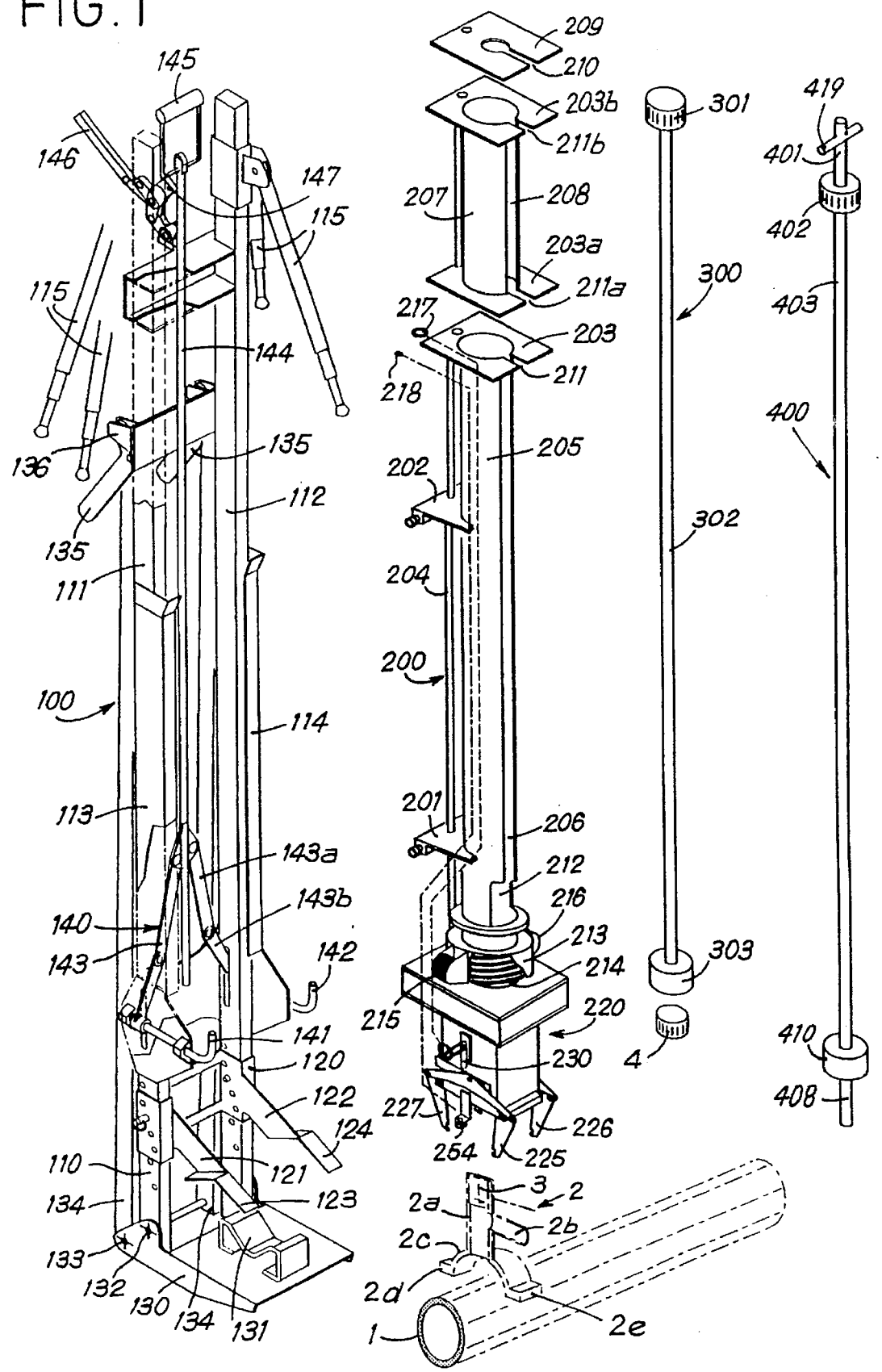
FIG. 1 is an overall perspective view of the apparatus of the invention, with its various functional assemblies being shown separated from one another.

With reference initially to FIG. 1, there can be seen an overall view of apparatus of the invention suitable for being inserted into a narrow hole that has been dug so as to reveal a length of pipe 1 on which a parallel connection or branch tapping 2 is to be installed.

The invention is particularly applicable to pipes and tappings that are made of a heat-fusible material such as polyethylene.

The branching tapping 2 may be of various different configurations, but essentially it comprises a saddle 2c of semicylindrical shape designed to be pressed against the convex surface of the pipe 1, and having lateral lugs 2d and 2e in the form of tabs or flanges. The tapping 2 comprises a vertical column 2a whose top portion includes an outside thread 2f for receiving a plug 4 for closing the column (FIG. 11). A lateral parallel connection tube 2b opens out into the column 2a. A punch 3 disposed inside the column 2a can be screwed and unscrewed in an internal thread 2g of the column 2a so as to perforate the portion of the pipe 1 that is situated at the bottom of the column 2a after the tapping 2 has been welded on the pipe 1 (FIG. 11).

The apparatus of the invention shown in FIG. 1 essentially comprises a frame 100, a tapping positioner 200 slidably mounted in the frame 100, and tools such as a perforator 400 and a driver for screwing and unscrewing the plug 300.

We begin by describing the frame 100 with reference to FIGS. 1 to 7.

The frame 100 comprises a vertical support structure 110 having two parallel vertical uprights 111 and 112 that are interconnected by spacers 116. The structure 110 is fitted with guiding slideways 113 and 114 that are fixed to the vertical uprights 111 and 112 and that are designed to guide the positioner 200 while it is being inserted into the frame 100 from above, prior to being installed in a hole (not shown).

Telescopic legs 115 are fixed to the top portion of the frame 110 on the uprights 111 and 112 to stabilize the frame 100 relative to the ground when the frame is installed in a hole. At the bottom of the structure 110, a support 120 for positioning on the top portion of the pipe 1 is secured to the uprights 111 and 112 and is adjustable in position so as to be adaptable to pipes of different diameters. The support 120 has two lateral arms 121 and 122 that extend laterally relative to the plane of the structure 110 and that terminate in upsidedown V-shaped contact pieces 123 and 124 for bearing against the pipe 1 on either side of the tapping 2.

The frame 100 further includes a tipping spade 130 designed to take up a position beneath the portion of pipe 1 that is to receive the tapping 2.

The tipping spade 130 carries a V-shaped support 131 designed to bear against the bottom surface of the pipe 1 opposite to the zone in which the tapping 2 is installed.

The tipping spade 130 is hinged firstly about a horizontal axis 132 that connects with the bottom portions of the fixed uprights 111 and 112, and secondly about a horizontal axis 133 that connects with the bottom portions of two vertical control rods 134 whose top ends are hinged about axes 138 to operating levers 135 which are themselves hinged about axes 137 to supports 136 that are mounted on the uprights 111 and 112 of the structure 110.

FIGS. 6 and 7 show the tipping spade 130 firstly in its vertical rest position where it is in line with the structure 110, which corresponds to a position a for being installed in or withdrawn from the frame 100, and secondly in a working, horizontal position that is perpendicular to the structure 110 so as to cause the V-shaped part 131 (not shown in FIGS. 6 and 7) to bear against the underside of the pipe 1 (the levers 135 having a dead center position b and a locking, overcenter, position c).

The frame 100 further includes a mechanism 140 for exerting a downward clamping force on the tapping positioner 200 when it is inserted in the frame 100.

The clamping mechanism 140 essentially comprises a vertical rod 144 capable of being displaced upwards and downwards by means of a handle 145 situated at its top end, the bottom portion of the control rod 144 being hinged on pairs 143 of hinged rods 143a, 143b that tilt two fingers 141 and 142 disposed at the ends of horizontal rods that extend laterally, perpendicularly to the plane of the frame 110. The fingers 141 and 142 constitute the curved ends of horizontal arcuate rods capable of being placed in a vertical rest position (with the handle 145 being in its high position of FIGS. 2 and 3) or in a horizontal working position (with the handle 145 being in a low position as shown in FIGS. 4 and 5). In the working position, the fingers 141 and 142 bear against wheels 215 and 216 that are mounted at the bottom end of the body of the tapping positioner 200.

A lever 146 provided with a locking catch 147 is hinged to the top end of the structure 110 and is capable of locking the handle 145 in a bottommost position, thereby adding to the manual displacement B of the handle 145 by means of an additional displacement C due to the action of the lever 146 so as to define a total displacement A (FIG. 4) in which the hinged rods 143a lock the fingers 141 and 142 in a horizontal position and exert additional force on the body of the positioner 200 via a rated spring 214 disposed in the body between the housing 213 supporting the wheels 215 and 218 and the support plate of a module 220 for supporting the tapping that is described below.

The frame 100 which can be positioned in a manner that is very accurate and stable between the ground via the telescopic legs 115 and the pipe 1 via the V-shapes 131, 123, 124 can serve simultaneously to provide easy guidance of the positioner 200 in the slideways 113 and 114 and to exert optimized and predetermined clamping pressure on the tapping support module 220.

The tapping positioner 200 that is slidable in the frame 100 is described below with reference to FIGS. 1, 8, 8A and 9, 10.

The positioner 200 essentially comprises a tool-positioning column 205 that is constituted by a long vertical tubular part that is split along one of its generator lines 206 to enable a tool rod 302, 403 to be inserted laterally therein, and having a bottom opening 212 that is of larger size for the purpose of passing a tool 303, 410 placed at the bottom end of the tool rod 302, 403.

Guide plates 201, 202 connected by a vertical rod 204 enable the column 205 to be guided and accurately positioned relative to the frame 100, wheels carried by the plates 201 and 202 being engaged in the slideways 113 and 114 of the frame 100.

Extensions 207 having respective slots 208 on a generator line and provided with endplates 203a and 203b likewise provided with slots 211a and 211b in line with the slots 208 may be added to the top end of the basic column 205 in the event that the pipe 1 is situated at a greater depth than normal. The bottom plate of an extension 207 is easily fixed on the top endplate 203 which is provided with a slot 211 and which is situated at the top of the column 205. A terminal plate 209 having a slot 210 and an opening that is smaller than the drive knobs 301 and 402 of the tools may be applied to the top of the column 205 or of its extensions 207 for the purpose of retaining said tools.

Beneath the split cylindrical column 205, the body of the positioner 200 is extended by a housing 213 having horizontal axis wheels 215, 216 mounted thereon and capable of bearing against the fingers 141 and 142 of the clamping mechanism mounted on the frame 100. A rated spring 214 is placed in the housing 213 above a bottom endplate 213a to enable a predetermined force, e.g. about 1500N, to be applied when the locking lever 146 has locked the handle 145 in its bottommost position.

A removable tapping support module 220 is mounted via an endplate 221a on the bottom endplate 213a of the body of the positioner 200. The removable module 220 may be adapted to various different types of tapping, but its overall structure is always of the type described more particularly with reference to FIG. 8.

Figure 9:
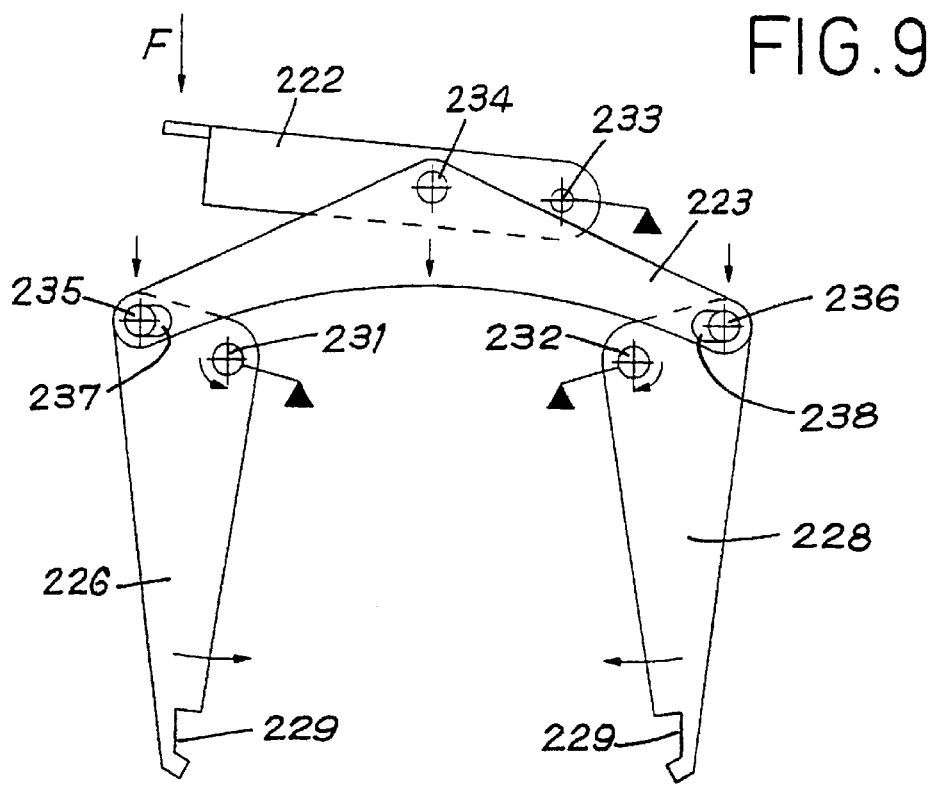
FIGS. 9 and 10 are diagrammatic front views of the means for grasping a branch connection tapping using apparatus of the invention and shown respectively in a closed position and in an open position.
Figure 10:
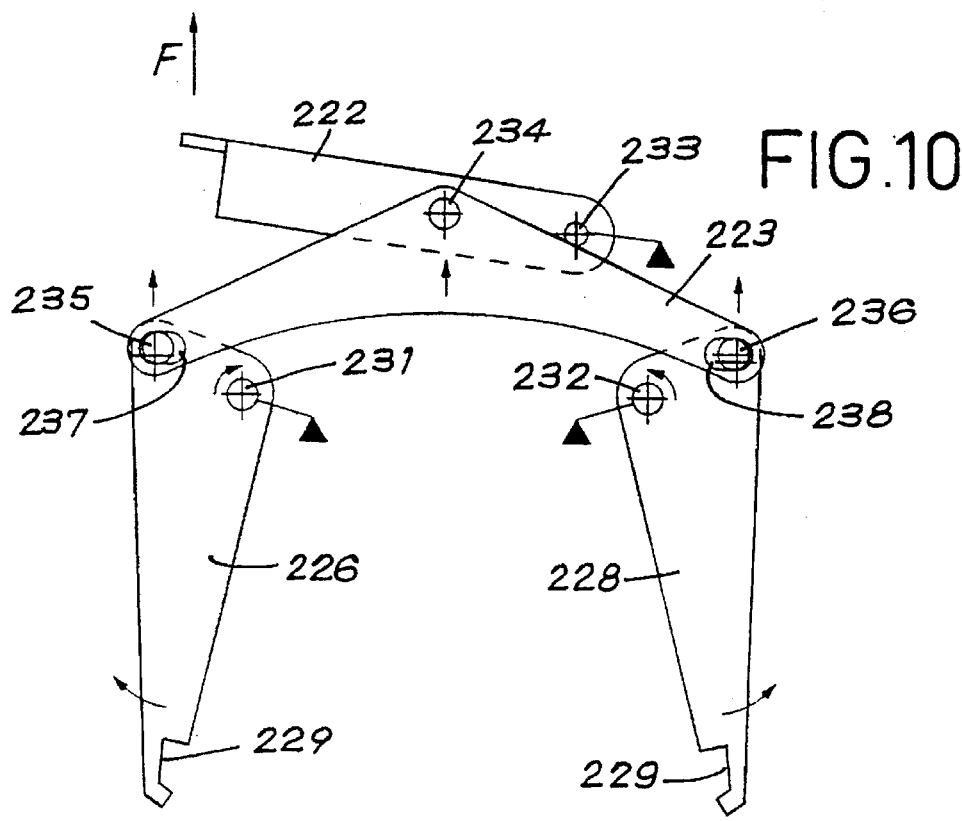

The removable module 120 essentially comprises a body 221, e.g. in the form of a rectangular parallelepiped, having an actuator frame 222 mounted thereon by being hinged about two horizontal pins 233. The frame 222 carries two spreaders 223, 224 which are hinged to the frame 222 about two horizontal pins 234 that are in alignment. Two pairs of jaw-forming triangular parts 25, 26 and 27, 29 are hinged firstly about horizontal axes 231, 232 at the bottom end of the body 221 of the grasping module 220, and secondly about horizontal axes 235 and 236 supported by the ends of the two arms of the two spreaders 223 and 224. The jaws 225, 226 or 227, 228 or the spreaders 223, 224 have respective openings 237, 238 that are larger than the hinge axes 235, 236 carried by the spreaders so as to enable the jaws 225 and 228 to move apart or to close together depending on the position imparted to the spreaders 223, 224 by the actuator frame 222 (FIGS. 9 and 10). The bottom ends of the jaws 225 to 228 have notches 229 which, in the closed position, engage over flanges 2d, 2e of the tapping 2 that is to be installed on a pipe 1 (FIG. 8).

Before the positioner 200 is installed in the frame 100, the tapping 2 is placed beneath the positioning module 220, the jaws 225 to 228 being in an open position, and then the actuator frame 222 is lowered to bring the jaws 225 to 228 into engagement with the lugs 2d, 2e of the tapping, thereby ensuring that the column 2a of the tapping is reliably positioned.

The actuator frame 222 may itself be actuated by a "grasshopper" type mechanism having a sliding rod 230 that can be brought into a low position for closing the jaws 225 to 228 by lowering a lever 241. A ring 219 fixed on the lever 241 makes it possible from the surface and by means of a cable 217 to cause the jaws 225 to 228 to take up an open position, thereby releasing the tapping 2, once the operations of installation, of welding, of piercing, and of screwing on a plug have all been terminated.

FIG. 8a shows one possible example of an electrical connection to the welding receptacles 252 secured to the tapping 2 and enabling said tapping to be welded by fusing in response to heat when an electrical current is applied to said welding receptacles 252 that are connected to an electrical resistance element incorporated in the saddle 2c of the tapping.

Welding plugs 251 connected via a cable 218 to a welding unit located outside the trench, are fixed to the welding receptacles 252 before the positioner 200 is inserted in the frame 100. Tabs 253 for withdrawing the welding plug are fixed to the body 221 of the module 220 and have an annular portion 254 which extends around the welding plug 251 and receptacle 252 on connection, thereby making it possible to disconnect the welding plugs 251 automatically when the module 220 is withdrawn upwards at the end of the operations for installing the tapping 2.

Returning to FIG. 1, there can be seen an example of a driver 300 for screwing and unscrewing a tapping plug 4, the driver comprising an actuating head or knob 301, a rod 302, and a tool 303 for grasping the plug 4. The driver 300 is inserted into the positioner 200 laterally when the positioner is in place in the frame 100 which is itself installed in the hole, and it serves to unscrew the tapping plug 4 after the tapping 2 has been welded to the pipe 1 and before the pipe has been perforated, and it also serves to screw the plug 4 back on after perforation and before the branch connection is put into operation. It will be observed that the driver 300 is guided inside the column 205, thereby guaranteeing that said tool operates properly.

An example of a perforator 400 that is particularly adapted to the apparatus of the invention is now described with reference to FIGS. 1 and 11 to 13.

Such a perforator 400 essentially comprises an internal rod 401 suitable for being rotated by a drive bar 419 situated at the top of the rod, an outer tube 403 coaxial with the rod 401 and capable of being rotated by a knob 402 situated at the top of the perforator, beneath the bar 419, and a coupling housing 410 mounted on the outer tube 403 to the bottom portion thereof and carrying a removable extension 408 that is connected inside the housing 410 to the bottom end of the internal rod 401. The extension 408 is itself designed to engage with the punch 3 located in the column 2a of the tapping 2. Means are provided inside the housing 410 to constitute automatic abutments during piercing operations.

With reference more particularly to FIGS. 11 to 13, it can be seen that the bottom end of the internal rod 401 has a stop collar 406 and is extended downwards by a female part 404 designed to receive the top male coupling end 407 of an extension 408 whose own bottom end has a square 409 for driving the punch 3 that is integrated in the column 2a of the tapping 2. The extension 408 is locked in position on the coupling 404 by a screw 418. The coupling 404 also includes a notch 405 enabling rotation of the rod 401 to be stopped once it has reached a predetermined position in which the collar 406 is practically in abutment against a shoulder 421.

The positioning housing 410 essentially comprises a top housing case 411 capable of being provided at its bottom end with three positioning teeth 412, for example, suitable for engaging in corresponding notches 414 formed in the periphery of a bottom plate 413 that is extended downwards by a cylindrical portion 415 that is provided with an inside thread 416 and that is capable of screw engagement on the outside thread 2f of the column 2a of the tapping 2 instead of the tapping plug 4.

A body 420 including abutment means is incorporated inside the top case 411 and rests on the bottom plate 413. The body 420 which may be made up of a plurality of portions comprises a shoulder 421 constituting an abutment for the collar 406 of the internal rod 401. Naturally, both the body 420 and the plate 413 are pierced by a central opening through which the bottom portion 404 of the rod 401 and the extension 408 penetrate. A stud 423 projecting from the bottom face of the body 420 and associated with a spring 424 and a catch 429 is capable of engaging in a receiving notch 417 formed in the plate 413 so as to define the proper position of the body 420 which includes a pawl 425 capable of rocking about a horizontal axis and having a tip 426 suitable for co-operating with the notch 405 formed in the bottom portion 404 of the rod 401. The pawl 425 has a rest position that is defined by an abutment screw 428 and it co-operates with a pusher 427 provided with a spring 427a for returning the pawl 425 to its rest position when the collar 406 is outside the body 420 above the shoulder 421. Otherwise, the pawl 425 comes into operation when the collar 406 causes the tip 426 of the pawl 425 to tilt into the notch 405, thereby preventing the rod 401 from rotating.

As can be seen in FIG. 13, the perforator device 400 comprises inside the housing 410 at least one lip gasket 431 interposed between the removable extension 408 and the central body 420, an O-ring 433 interposed between the central body 420 and the base plate 413, and an O-ring 432 interposed between the base plate 413 and the top portion of the column 2a on which the cylindrical portion 415 is screwed. An additional O-ring 434 may be interposed between the plate 413 and the extension 408 (not shown in FIG. 13).

The perforator 400 of the invention can be adapted to pipes, in particular polyethylene pipes, having a wide range of diameters, e.g. about 60 millimeters to about 200 mm. The fixing of the perforator 400 by the threaded cylindrical portion 415 does not damage the thread 2f of the tapping 2 because the perforator 400 is guided within the positioning column 205.

By using extensions 408 that are adapted to different types of tapping, the device 410 ensures accurate and reliable abutments firstly at the end of the punching stroke and secondly at the end of the lifting stroke, thereby guaranteeing that there is no risk of gas leakage past the coupling plug 415, the O-rings 432, 434, and the lip gasket 431 relative to the rotary column.

The perforator device 400 is implemented as follows:

Initially the coupling plug 413, 415 corresponding to the tapping 2 in question is mounted on the body 420 relative to centering and holding pegs, and by rotating the parts relative to one another the catch 429 and the spring 424 are caused to put the finger 423 into place in the corresponding notch 417 of the coupling plug 413, 415, thereby guaranteeing proper positioning.

After the appropriate extension 408 has been inserted in the coupling 404 secured to the rod 401, the screw 418 is tightened.

The perforator device 400 is then lowered into the hole and is inserted into the slot 206 of the column 205.

On contact with the tapping 2, the coupling plug 413, 415 is screwed on using the knob 402 which drives the outer tube 401 and the top case 411 of the housing 410 which is in engagement with the plug 413, 415. Simultaneously, the square 409 of the extension 408 is positioned in the punch 3.

Once the cylindrical element 415 has been screwed into place, the punch 3 is rotated by means of the bar 419 that is secured to the rod 401, which rod may be tubular in shape. At the end of the cycle, the collar 406 tilts the pawl 425 so that its tip 426 penetrates into the groove 405 on the coupling part 404. With the elements 419, 401, 404, 408 and 3 thus being constrained to rotate together, piercing is terminated.

To raise the punch 3, the rod 401 is pulled up a little way so that the pawl 425 escapes from the groove 405 under drive from the pusher 427 and its spring 427a. By rotating the rod 401 at the end of the stroke in the opposite direction to the piercing direction, the collar 408a of the extension 408 itself comes into abutment inside the cylindrical portion 415 of the coupling plug. The punch 3 is then flush with the top of the tapping 2. The entire coupling plug (housing 410) can then be unscrewed by rotating the knob 402 on its own, while the tube 401 is held in position.

The perforator device 400 can then be withdrawn from the column 205 through the slot 206 and can be raised to the surface so as to allow a driver device 300 to be inserted in the column 205 so as to put the tapping plug 4 back into place.

After the plug 4 has been tightened back on the tapping which has been finally welded on and put into communication with the pipe 1, the jaws 225 to 228 of the tapping carrier module 220 are unlocked by pulling on the cable 217 so as to release the tapping 2, and then the lever 146 and the handle 145 are actuated to unlock and withdraw the positioner 200. The telescopic legs 115 can then be withdrawn, the spade 130 is returned to the vertical position by the levers 135, and the frame 100 can be lifted out of the hole.

We claim:

1. Apparatus for installing a saddle-shaped parallel connection tapping on a pipe, in particular a pipe for distributing gas, the tapping being put into place from the top of a hole dug around the installation zone for the tapping, the apparatus comprising means for grasping the tapping and means for applying a determined clamping force between the tapping and the pipe, in particular for the purpose of securing the tapping to the pipe during an operation of welding the tapping to the pipe, the apparatus comprising:

a) a frame comprising a vertical support structure provided with guide slideways and including both a set of telescopic legs connected to the top portion of the structure and a tipping thrust device in the form of a spade placed at the bottom end of the structure and designed to take up a position beneath the pipe and capable of performing pivoting motion between a vertical rest position and a horizontal working position under the control of rodding from the top portion of the frame;

b) a removable tapping positioner comprising a tubular column that is split along one of its generator lines and that is fitted at its bottom end with a disconnectable tapping-support module provided with tapping-retaining means for holding rims of the tapping, the tapping positioner including guide means that cooperate with said guiding slideways during downwards insertion into the frame;

c) pressure-exerting means mounted on the frame to exert downwards pressure on the tapping support module in selective manner as determined from the top of the frame;

d) means mounted on the removable tapping support module for securing the tapping to the pipe;

e) a removable driver device adapted to be inserted laterally into the tool-positioning column and provided with guide means inside said tool-positioning column;

f) a removable perforator device adapted to be inserted laterally into the tool-positioning column and provided with guide means inside said tool-positioning column; and g) means mounted on the tapping positioner for remotely controlling release of said tapping-retaining means.

2. Apparatus according to claim 1, wherein a first V-shaped support is disposed on the spade to bear against the bottom portion of the pipe and wherein upsidedown V-shaped supports are adjustably mounted on the frame structure to be placed against the top portion of the pipe on either side of the tapping that is to be installed.

3. Apparatus according to claim 1, wherein the pressure-exerting means mounted on the frame comprise pivoting fingers that are controlled from the top by links hinged on a vertical rod and co-operating with wheels disposed at the bottom of the tool-positioning column.

4. Apparatus according to claim 3, further comprising means for locking the control means of the pivoting fingers and a rated spring incorporated at the base of the tool-positioning column for establishing a predetermined pressure on the tapping support module.

5. Apparatus according to claim 1, wherein the means for holding the rims of the tapping comprise parts provided at their bottom ends with notches designed to engage on the rims of the tapping, the parts being hinged at the top firstly to the fixed body of the tapping support module and secondly to spreaders that are themselves hinged to a structure for controlling opening or closing of said hinged parts.

6. Apparatus according to claim 5, wherein the control structure is held in its closure-controlling position for the hinged parts by a sliding rod provided with locking means that can be unlocked from above by means of a control cable.

7. Apparatus according to claim 1, wherein said means for securing the tapping to the pipe comprise welding receptacles secured to the tapping, welding plugs connectable to the welding receptacles and connected by cable to a welding unit located outside the hole, and tabs secured to the tapping support module and comprising a portion disposed around a welding receptacle and beneath the welding plug so as to cause the welding plug to be automatically disconnected when the tapping support module is withdrawn after the tapping has been pug into place on a pipe.

8. Apparatus according to claim 1, wherein said perforator device comprises an internal rod whose bottom end is connected to a removable extension provided with an end that co-operates with a punch disposed in the column of a tapping to be installed, and an external tube concentric with the internal rod and secured to a housing surrounding the connection zone between the internal rod and the removable extension.

9. Apparatus according to claim 8, wherein the coupling housing of the perforator is made of three portions and comprises a top outer case, a base plate that is extended downwards by a cylindrical portion provided with an inside thread for screwing onto an outside thread of the column of the tapping to be installed, and a central body that forms an abutment for the internal rod of the perforator.

10. Apparatus according to claim 9, wherein the central body of the coupling housing includes a rocking pawl that co-operates with a collar secured to the internal rod of the perforator and with a notch formed in the bottom portion of said internal rod situated beneath said collar upstream from the removable extension.

11. Apparatus according to claim 9, wherein the central body includes a stud subjected to drive from a spring for positioning said body on said base plate.

12. Apparatus according to claim 9, wherein the perforator device includes at least one lip gasket interposed between the removable extension and the central body, an O-ring interposed between the central body and the base plate, and an O-ring interposed between the base plate and the top portion of the column on which the cylindrical portion extending the base plate downwards is screwed.

13. Apparatus according to claim 1, wherein it is applied to installing a parallel connection tapping of polyethylene which is welded to a polyethylene pipe by hot fusing.

\* \* \* \* \*

UNITED STATES PATENT AND TRADEMARK OFFICE
CERTIFICATE OF CORRECTION

PATENT NO. : 5,659,935

DATED : August 26, 1997

INVENTOR(S) : Jean-Marie Lo-Pinto; Jacques Foucart; Jean-Claude Puyaumont; Christian Vilchenon; Thierry Vincent It is certified that error appears in the above-identified patent and that said Letters Patent is hereby corrected as shown below:

Column 11, line 5 - "pug" should read -- put --.

Signed and Sealed this

Twenty-first Day of October 1997

Attest:

BRUCE LEHMAN

Attesting Officer

Commissioner of Patents and Trademarks